US006282545B1

(12) United States Patent
Coats

(10) Patent No.: US 6,282,545 B1
(45) Date of Patent: Aug. 28, 2001

(54) MECHANISM FOR INFORMATION EXTRACTION AND TRAVERSAL FROM AN OBJECT BASE INCLUDING A PLURALITY OF OBJECT CLASSES

(75) Inventor: Mark Ronald Coats, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/144,905

(22) Filed: Oct. 28, 1993

(51) Int. Cl.[7] .................................................. G06F 17/30
(52) U.S. Cl. ............................................ 707/102; 707/103
(58) Field of Search .................................... 395/600, 700, 395/160, 161, 144, 145, 147; 707/100, 101, 102, 103, 104

(56) References Cited

U.S. PATENT DOCUMENTS

| 4,860,203 | * | 8/1989 | Corrigan et al. | 395/700 |
|---|---|---|---|---|
| 4,982,344 | | 1/1991 | Jordan | 395/157 |
| 5,019,961 | * | 5/1991 | Addesso et al. | 364/192 |
| 5,241,624 | * | 8/1993 | Torres | 345/429 |
| 5,408,667 | * | 4/1995 | Brodie et al. | 717/2 |
| 5,414,809 | * | 5/1995 | Hogan et al. | 345/349 |
| 5,432,925 | * | 7/1995 | Abraham et al. | 709/316 |
| 5,432,942 | * | 7/1995 | Trainer | 395/700 |
| 5,437,025 | * | 7/1995 | Bale et al. | 707/103 |

FOREIGN PATENT DOCUMENTS

| 458495 | 11/1991 | (EP) . |
|---|---|---|
| 501770 | 9/1992 | (EP) . |

* cited by examiner

*Primary Examiner*—Paul V. Kulik
(74) *Attorney, Agent, or Firm*—McGuireWoods, LLP; Gregory M. Plow

(57) ABSTRACT

A method and computer program extracts information from both software and non software sources. The system facilitates the traversal and filtering of the extracted information. Object oriented programming techniques are used in the implementation of the system.

8 Claims, 5 Drawing Sheets

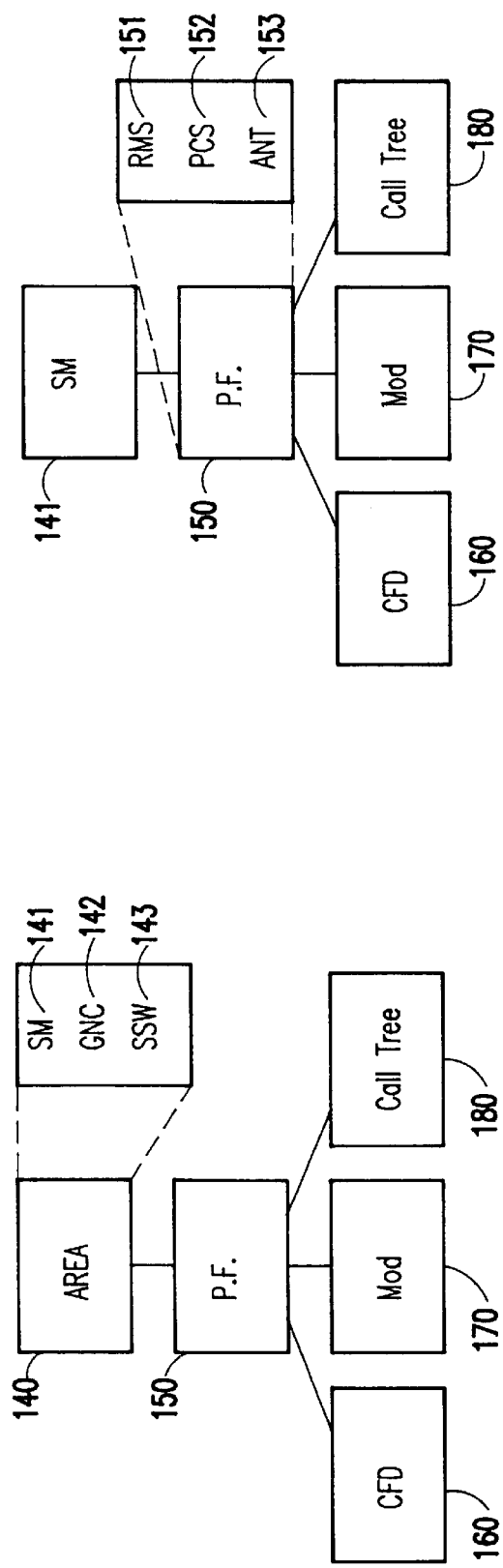
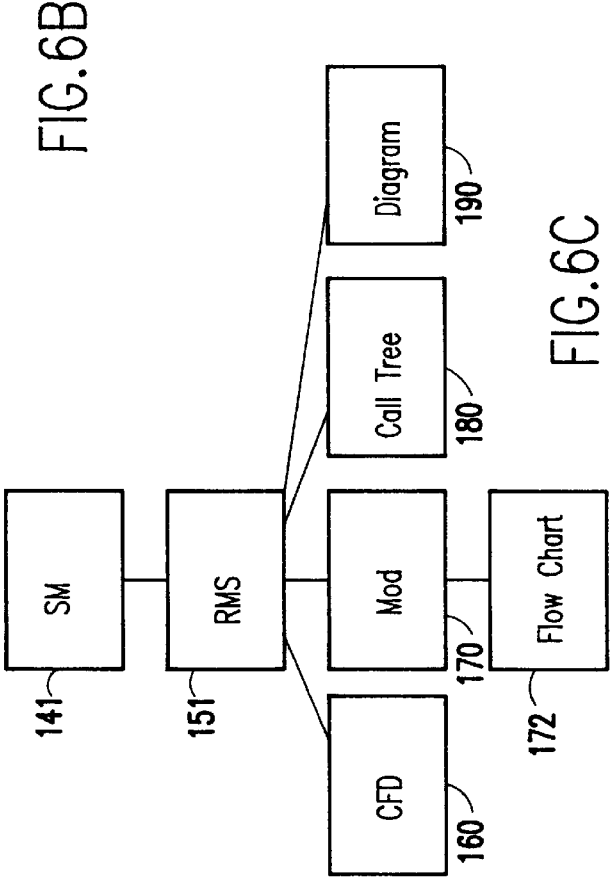
FIG.6A
FIG.6B
FIG.6C

MECHANISM FOR INFORMATION EXTRACTION AND TRAVERSAL FROM AN OBJECT BASE INCLUDING A PLURALITY OF OBJECT CLASSES

BACKGROUND OF THE INVENTION

1. Field of the Invention

The present invention generally relates to a method for extracting information from a variety of sources and for traversing the information. More specifically, this invention relates to a method of extracting information from existing software and from other sources and building an object base. In addition, it relates to a mechanism for traversing the information in an efficient manner and for filtering the information so that only pertinent information is seen by the user. This invention includes methods which incorporate object oriented design concepts.

2. Description of the Prior Art

A continual process of evolution and development is part of the life cycle of computer software. This evolution and change often results in the generation of a large amount of information available as documentation for the software. The information is generally the programming code of the application or the internal or external documentation which is provided with the system. This process often creates a high degree of complexity in the system and the documentation. Usually, as the system develops, the amount of documentation for the system increases proportionally. In order to understand a particular aspect of a system, it is often necessary to screen out a large amount of data which is irrelevant. This allows the systems analyst to focus on the pertinent information. However, it is often the case that the sources of the information are not well organized and are not in a standardized format. Therefore, a large amount of effort is wasted in determining where appropriate information can be found and in organizing and understanding the information once it is found.

In some systems, no documentation is available for the program as it was originally written or for revisions subsequently made to the code. Therefore, the systems analyst must extract as much information as possible from the code itself. This involves a great deal of effort since the analyst must analyze a major part of the hardware, software and integration flow and then use this information to draw his own conclusions. In addition, the information which can be derived is often incomplete or difficult to understand. Moreover, if the analyst fails to record his efforts, it would be necessary to repeat the analysis the next time the information is needed.

Two approaches have been suggested to reduce the complexity usually associated with the evolution of computer software systems. The first is to prevent the increase in the complexity of the information by developing standards which must be enforced throughout the lifetime of the project. However, this solution is difficult to implement because it requires a large amount of foresight to develop the proper standards and a high degree of effort to enforce the standards during the lifetime of the system. The second approach is to extract as much information as possible from the existing system and to use the information to rebuild the system and reduce the complexity. Then, standards can be implemented to prevent the reoccurrence of the problem.

Systems and methods have been developed to extract information from existing software. These systems use a massive parser program to create a static database of information. The parser program is separate from the database and is run in batch mode. The parser cannot retrieve information from non software sources and when it is used with large software programs it often requires an unacceptable amount of time to populate the database. Finally, these systems do not include a method for retrieving the data in an organized manner or for combining it with other information. Since the software and non software information cannot exist in the same database, the data is not easily combinable.

SUMMARY OF THE INVENTION

It is therefore an object of the present invention to provide a system which extracts information from software and a variety of other sources and provides a mechanism for traversing and filtering this information.

It is another object of the present invention to provide a mechanism for efficient retrieval of information from a variety of sources.

It is also an object of the present invention to provide a dynamic data extraction system.

It is a further object of this invention to provide a method to maintain large data bases of information.

It is another object of this invention to provide a means for integrating the system for data extraction and traversal with other computer software programs.

According to the invention, there is provided a system and a method for the extraction of information from computer software and from other sources. An object base, which utilizes an object oriented data base engine, contains object classes which each include programs called populators which are used to populate a single object in the object base. In addition, the system includes a means for the traversal and filtering of the extracted information. The traversal system utilizes a combination of hypertext, tree traversal and object oriented techniques for the user interface and to obtain the desired view of the information.

The implementation of an extraction and traversal system requires the definition, in a standardized format, of the requirements for the desired data types. The requirements must include a definition of the appropriate action for each node of the hypertree. The data requirements are then implemented as specific object classes in the object base. In addition, an object populator is built for each object class and is stored with the object class in the object base. At this point, the hypertree and object base are ready to be used by the user. The traversal of the object base starts when the user selects a node of a hypertree. The hypertree program queries the object base and the populator for the chosen object determines whether the information is current. If not, the populator is run. If the data is up to date or after it has been updated, the information is passed to the hypertree program. Finally, depending on the desired view, the information is either passed to a window for display or is passed to an external program for further processing and then display.

BRIEF DESCRIPTION OF THE DRAWINGS

The foregoing and other objects, aspects and advantages will be better understood from the following detailed description of a preferred embodiment of the invention with reference to the drawings, in which:

FIGS. 6A, 6B and 6C are examples of the hypertree front end which is used to filter the information and guide the user through the object base.

DETAILED DESCRIPTION OF A PREFERRED EMBODIMENT OF THE INVENTION

Figure 1:
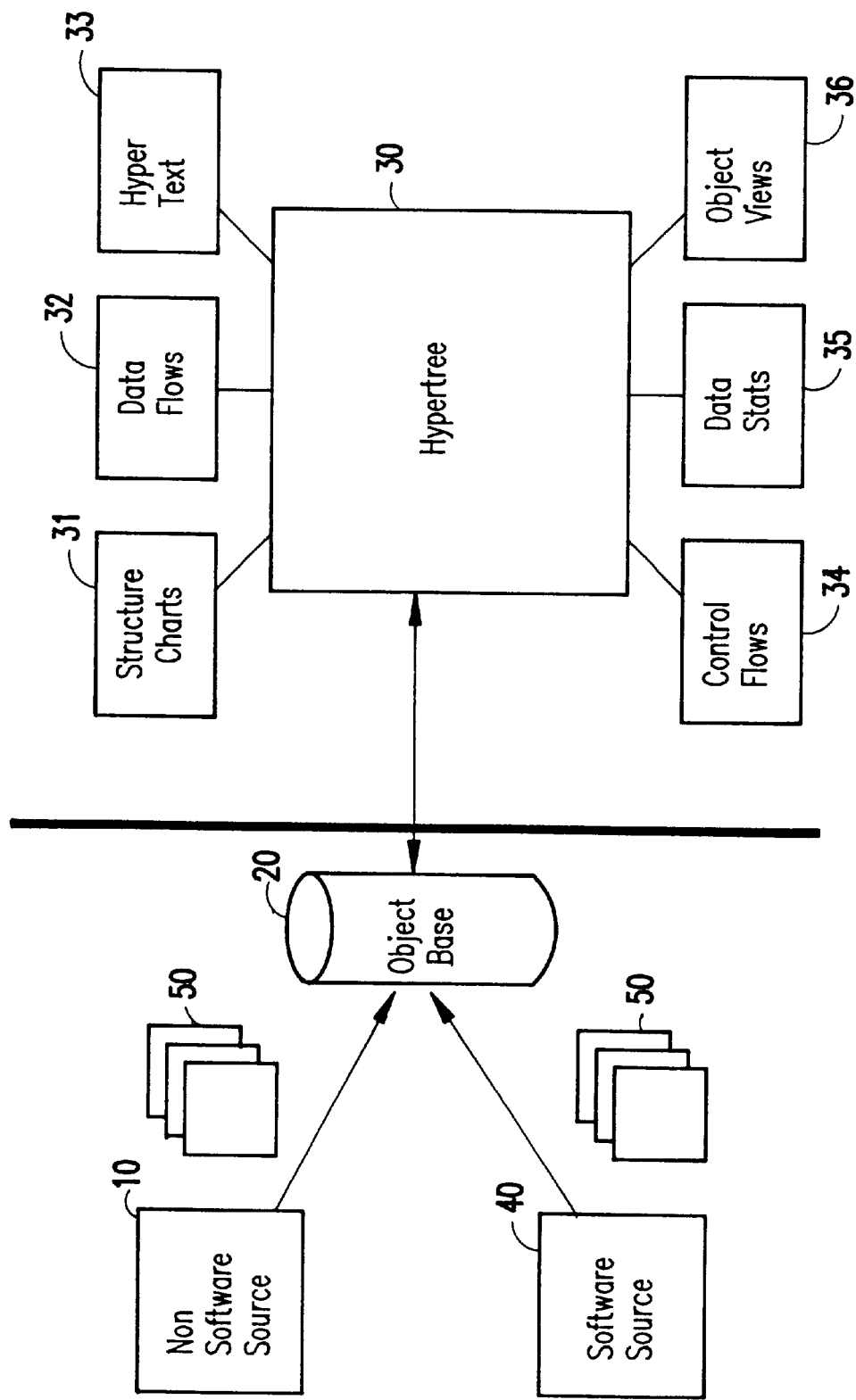
FIG. 1 is a diagram which illustrates a high level view of the design for the extraction and traversal of data.

The focus of the information extraction system is the building of an object base. Referring to FIG. 1, the object base 20 includes definitions of classes which can obtain information from both software sources 40 and non software sources 10. The object base utilizes an object oriented data base engine. The object classes included in an object base are defined by the object base administrator. Each object class includes object attributes which describe the class and a "populator" 50 which is responsible for populating the object with the attribute data. In many cases, the "populator" is a unique set of functional code which extracts information from a specific source.

The objects defined by software are generally language constructs and can be built for many types of software languages. For example, an ADA object would be MODULE. The attributes of the object would include: MODULE_TYPE (PACKAGE, PROCEDURE, FUNCTION, TASK, EXCEPTION, BLOCK), MODULE_NAME, FILE_NAME, and LIBRARY_NAME. The data in this object can easily be linked to other objects. This format allows a large number of language objects to be created using any number of programming languages.

Figure 2:
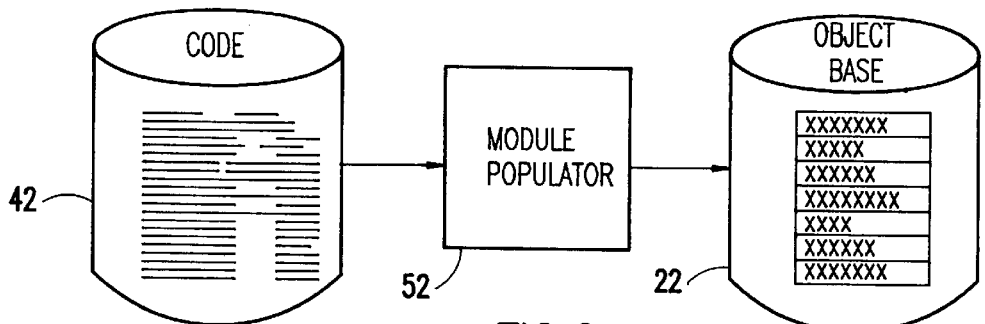
FIG. 2 is an illustrative example of a populator which extracts information from a software source.

Each language object in the database will usually have a parser which is responsible for populating the attributes defined in that object. For example, using the MODULE object as defined supra, the parser populator would exclusively search for instances of modules which populate the attributes MODULE_NAME, FILE_NAME, and LIBRARY_NAME. The parser populator would then capture the data for the modules which satisfied the search criteria. FIG. 2 shows in more detail the relationship between a software source 42, a module populator 52 and an object base 22. This method allows a unique parser to be implemented for each object which permits the data to be refreshed whenever the data becomes stale or as desired. The populator can be programmed to be invoked whenever the object is selected or when the data satisfies a given set of criteria indicating the need to refresh the data.

The system described above allows the object to be populated regardless of the language, environment, operating system or platform in use. In addition, the use of an interactive approach allows each populator to retrieve only the pertinent information at the time it is needed. This eliminates the delay associated with parsing and creating the whole database at one time. Finally, the interactive method insures that the user is accessing the most current version of the system.

The method disclosed in the present invention also allows the extraction of information from other sources of data which cannot be obtained using a parser. The extraction mechanism used to obtain information from sources other than software varies depending on the type of data and the source. Some examples of additional sources which can be used include requirements documents, flowcharts, graphs, user's guides, knowledge possessed by individuals, on-line text or existing database support information.

The large number of methods for capturing the non software sources of information has prevented attempts to extract important and often necessary information. The system disclosed in this application allows the integration of appropriate extraction tools as required for each object to be populated with the information.

Figure 3:
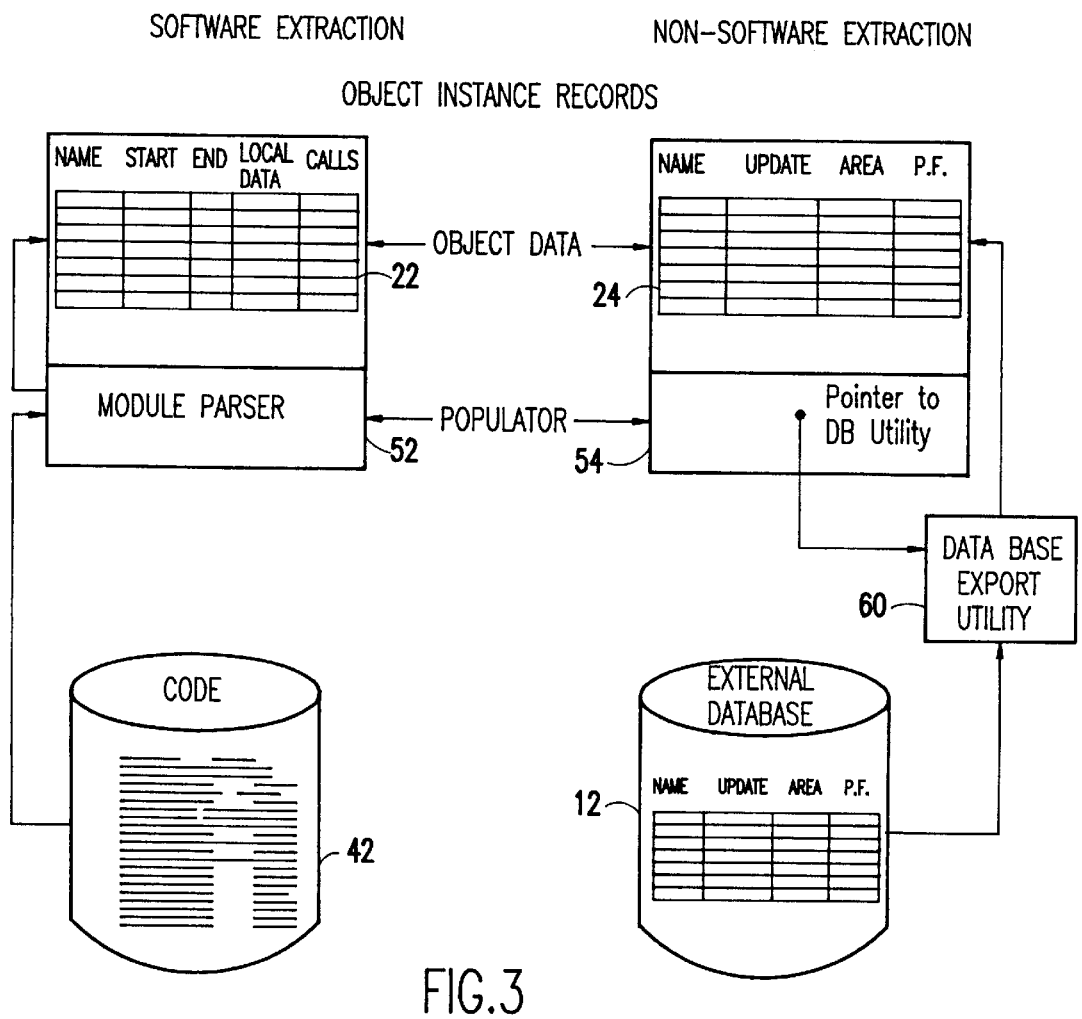
FIG. 3 is a diagram which highlights the similarities and differences between an extraction from a software source and one from a non-software source.

FIG. 3 provides an example which compares a populator for a software source to one for a non-software source. The software populator 52 contains code which parses out modules in the code 42. The non-software populator 54 is a pointer to a database utility which directs the extraction of module statistics using a data base exportation utility 60 from an existing data base 12. Although different techniques are used to populate the objects, in both cases the populator or a pointer to the populator is stored with the object record on the object base. The object data 22 and 24 is the data which is retrieved and stored in the object base.

Other examples of extraction from non-software sources include obtaining information from individuals using an interactive knowledge extractor or from documents. The information possessed by individuals is often obtained using knowledge base programs to directly query the user for the necessary information. The information recorded on documents can be extracted using an optical character reader which reads the scanned information into the object base. It is also possible to use data base entry screens to allow the analyst to directly enter the non-software data.

The definition of objects in the object base allows for easy access to a large amount and wide variety of information. In addition, since data from both software and non software sources exist in a single database, it is easy to combine the information to provide new views and a better understanding. Furthermore, the use of individual populators in an object base allows new types of information to be easily integrated into the system.

Figure 4:
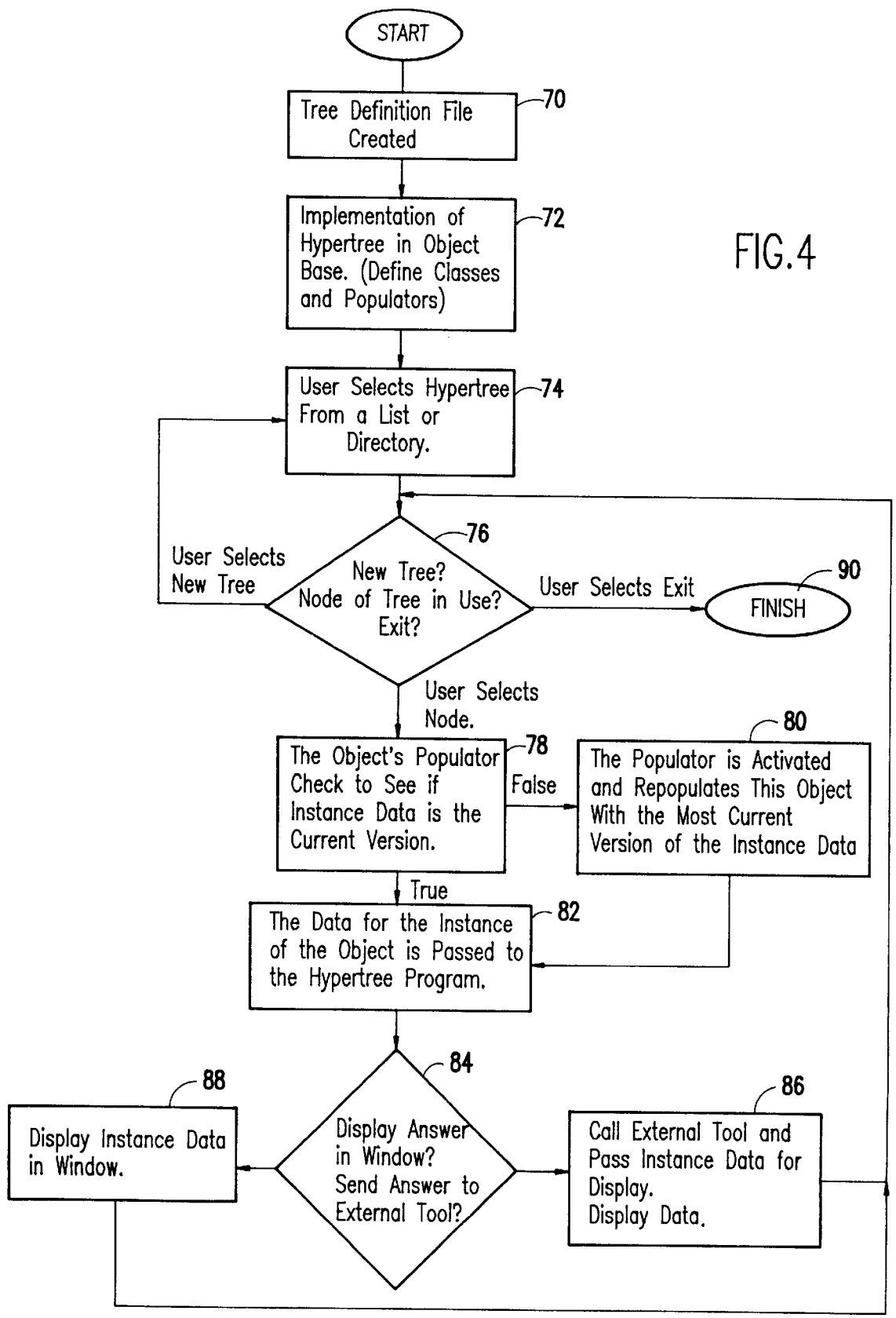
FIG. 4 is a flow diagram which details the logic of the creation and the use of an information extraction and traversal system.

FIG. 4 is a flow diagram which details the creation of a hypertree and the interaction between the request of information by the user and the appropriate response by the object base. First, at 70, the hypertree definition file is created by the tree designer. This file specifies the relationships between the data and the graphical representation of the data which will be viewed by the user. The creation of the hypertree front end will be discussed in detail, infra. Then, each object class and populator is defined 72 based on the relationships and information set forth in the tree definition file. The creation of objects and populators has been discussed supra.

At block 74, the hypertree system has been created and the logic involved in the execution of a hypertree begins with the selection of a hypertree which provides the desired view of the data. It is possible to provide multiple views and combinations of the data in a single object base by implementing a variety of hypertrees. Next, the hypertree is displayed and the user has the option of continuing with this tree, selecting a new tree or exiting from the system 76. If the user selects a new tree, the control of the program is returned to block 74. On the other hand, the selection of exit passes control to block 90, where execution is finished. The selection of a node of the current hypertree signals the program to query the appropriate object class and determines whether the data is current 78. If the data needs to be updated, false is returned and the control is sent to block 80. At this point, the populator is invoked and the object is repopulated with the most current data. Then, the updated data is passed to the hypertree front end 82. If, at block 78, the data in the object is found to be current, true is returned.

Since there is no need to run the populator, control passes to 82, where the object data is passed to the hypertree program.

The hypertree program then determine whether the information is in the appropriate form or needs to be sent to an external view for an alternate view or further processing 84. If no additional processing is necessary, the program, at block 88, displays the instance data in a window. However, if an external tool is necessary to present the desired information, control passes to 86, whereby an external tool is called and is passed the instance data for display. At this point, the hypertree with the new view of the data is displayed and the user, once again, has the options in block 76.

As mentioned above, the second part of the system is a traversal method and program which is designed to filter information and guide the user through the object base. As shown in FIG. 1, Hypertree 30, the traversal program, integrates a variety of external applications that use the object base data to create abstract views of the data. The Hypertree program uses a variety of object oriented techniques, tree traversal concepts and hypertext to implement the traversal system. Some examples of the applications which can be used in conjunction with Hypertree 30 include structure charts 31, data flows 32, hypertext 33, control flows 34, data stats 35 and object views 36.

Hypertree 30 is a computer program which allows a "tree designer", an individual who builds the tree, to create a hypertree to be used by an end user. The tree designer uses the system to customize the tree for any number of systems and subsystems. However, the basic framework for the hypertree is provided by the system. The trees are designed to include information which allows the program to display a graphical hierarchy on the screen. The tree only shows the subset of objects which are relevant to the end user.

Figure 5:
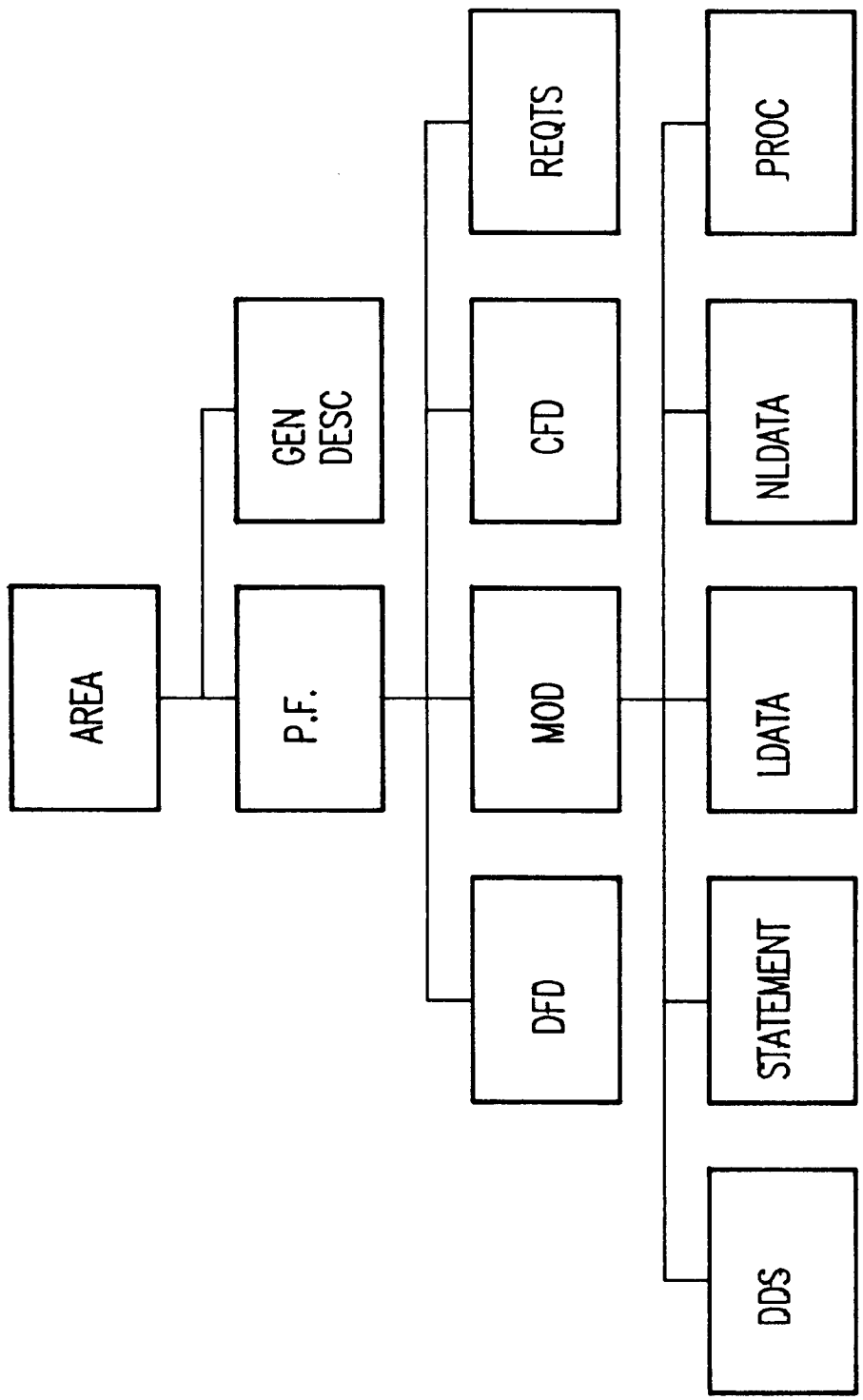
FIG. 5 is an illustrative example of a hypertree.

As shown in FIG. 5, each hypertree is a hierarchical representation of the relationship between objects with each node of the tree representing an object class in the data base. The classes are connected by lines, with a higher node representing a parent and a lower node being a child. The child node provides information about the parent node.

The tree designer determines the structure of the hypertree according to the relevance of the objects to each of the other classes. These relationships are defined in a tree definition file which is a simple ASCII text file. An example of a tree definition file is shown below.

TREE NAME: TEST SOFTWARE

| NODES | PARENT | ACTIONS | INHERITANCE MATIRX |
|---|---|---|---|
| AREA | ROOT | QUERY_INSTANCES(AREA); | ALL; |
| P.F. | AREA | QUERY_INSTANCES(P.F.); | ALL; |
| AREA DES | AREA | CALL HYPERTEXT(AREA); | ALL; |
| DFD | P.F. | QUERY_INSTANCES(MOD); QUERY_INSTANCES(MOD, NLDATA); CALL DFD_MAKER(MOD, NLDATA); | ALL; |
| CFD | P.F | QUERY_INSTANCES(MOD_CALL); QUERY_INSTANCES(PROC_CALL); CALL CFD_MAKER(MOD_CALL PROC_CALL); | ALL; |
| MOD | P.F. | QUERY_INSTANCES(MOD); | ALL; |
| RQTS | P.F. | QUERY_INSTANCES(P.F., REQTS); | ALL; |
| P.F. DES | P.F. | CALL HYPERTEXT(P.F.); | ALL; |
| DDS | MOD | QUERY_INSTANCES(MOD, STATE); CALL DDS_MAKER(MOD, STATE); | ALL; |
| STATE | MOD | QUERY_INSTANCES(STATE); | ALL; |
| PRCC | MOD | QUERY_INSTANCES(PROC); | ALL; |
| INCL | MOD | QUERY_INSTANCES(INCL); | ALL; |
| CODE | MOD | QUERY_INSTANCES(CODE); | ALL; |
| REPL | MOD | QUERY_INSTANCES(REPL), | ALL; |
| STR | MOD | QUERY_INSTANCES(STR), | ALL; |
| LDATA | MOD | QUERY_INSTANCES(LDATA); | ALL; |
| NLDATA | MOD | QUERY_INSTANCES(NLDATA); | ALL; |
| MOD DES | MOD | CALL HYPERTEXT(MOD); | ALL; |
| RMS VIDEO | P.P. | CALL VIDEO (RMS); | P.F. = RMS; |
| SM VIDEO | AREA | CALL VIDEO (SM); | AREA = SM; |

The file is structured and includes a parent child field which determines the layout of the tree, a field which includes a set of actions for each node, and a field which specifies which children should be displayed when the node is instantiated. Other fields can be added as necessary.

FIGS. 6A to 6C provide illustrative examples of the hypertree traversal system. In general, a user chooses a node of the tree for which more information in desired. Hypertree obtains the instances for that object class and displays them in the node which was selected and all dependent nodes. Therefore, the shape of the tree can vary depending on the particular node selected by the user.

As specifically shown in FIG. 6A, the selection of the Area node 140 by the user causes the program to query the object base to search for and retrieve all of the instances of Area. As shown in the block to the right, three instances of area were found, SM 141, GNC 142, and SSW 143. If the user then chooses SM, the Area node has now become instantiated with SM 141 as shown in FIG. 6B. In addition, all of the children of this node will inherit the qualities and characteristics of the SM object class.

Suppose the user then chooses the PF node 150 invoking the program to request all instances of PF for SM which exist in the object base. As shown, three instances were found, RMS 151, PCS 152 and ANT 153. The user selects RMS, thereby signaling the program to instantiate the PF node with RMS and the dependent nodes with the appropriate inherited information. The resulting tree is shown in FIG. 6C. It should be noted that RMS has two additional nodes, flow chart 172 and diagram 190 which are displayed when the node was instantiated. The program, when developed by the tree designer, was implemented to include these object classes for this instance. This is an example of the dynamic nature of the tree shape.

In addition to querying the object base for instances or information, the nodes can also be implemented to invoke external applications. These programs can be used to provide abstract views of the data. An example of this is the CALL_TREE node 180 which allows the user to see a procedure call tree of the software. The user selects this node which requests all instances of the PROCEDURE object class from the object base. After the information is retrieved, the program then invokes an external call tree builder program. The external program is passed the procedure call tree which is then displayed in a window.

The hypertree system provides an open architecture to be used for information traversal. The hypertree designer can develop trees for a variety of systems. The trees can access different data and can integrate a variety of external programs. However, since all of the data is centrally located in a single object base, the trees can reference any combination of objects.

While the invention has been described in terms of a single preferred embodiment, those skilled in the art will recognize that the invention can be practiced with modification within the spirit and scope of the appended claims.

What is claimed is:

1. A system for the extraction and traversal of information, comprising:

an object base which includes a plurality of object classes;

means for defining attribute data for each of said object classes;

means for populating each of said plurality of object classes with said attribute data, said data being extracted from a source;

means for creating a hierarchical tree with a plurality of nodes, each said nodes corresponding to one of said object classes in said object base;

means for searching said object base for instances of a selected one of said object classes, a selection of one of said nodes invoking said means for searching; and means for providing results of a search of said object base to said means for creating, whereby said results are used to alter said hierarchical tree.

2. A system for the extraction and traversal of information, as recited in claim 1, wherein said source is selected from the group consisting of a software source and a non-software source.

3. A system for the extraction and traversal of information, as recited in claim 1, further comprising:

means for associating each of said object classes with a corresponding one of said populating means.

4. A system for the extraction and traversal of information, as recited in claim 3, further comprising:

means for invoking said populating means when a predefined set of criteria indicate that said attribute data should be refreshed.

5. A method of extracting and traversing information, comprising:

creating an object base which includes a plurality of object classes;

defining attribute data for each of said object classes;

creating populators for each of said plurality of object classes, said populators extracting said attribute data from a source;

generating a hierarchical tree with a plurality of nodes, each of said nodes corresponding to one of said object classes in said object base;

searching said object base for instances of a selected one of said object classes, a selection of one of said nodes invoking said means for searching; and providing results of a search of said object base to said means for creating, whereby said results are used to alter said hierarchical tree.

6. A method of extracting and traversing information, as recited in claim 5, wherein said source is selected from the group consisting of a software source and a non-software source.

7. A method of extracting and traversing information, as recited in claim 5, further comprising:

associating each of said object classes with a corresponding one of said populators.

8. A method of extracting and traversing information, as recited in claim 7, further comprising:

invoking said populator when a predefined set of criteria indicate that said attribute data should be refreshed.

* * * * *